Oct. 17, 1944.　　　G. H. PERRY　　　2,360,715
PNEUMATIC CUSHION
Filed May 14, 1942　　　2 Sheets-Sheet 1

INVENTOR.
GEORGE HOUGH PERRY
BY
Van Devanter & Grier
ATTORNEYS.

Oct. 17, 1944. G. H. PERRY 2,360,715
PNEUMATIC CUSHION
Filed May 14, 1942 2 Sheets-Sheet 2
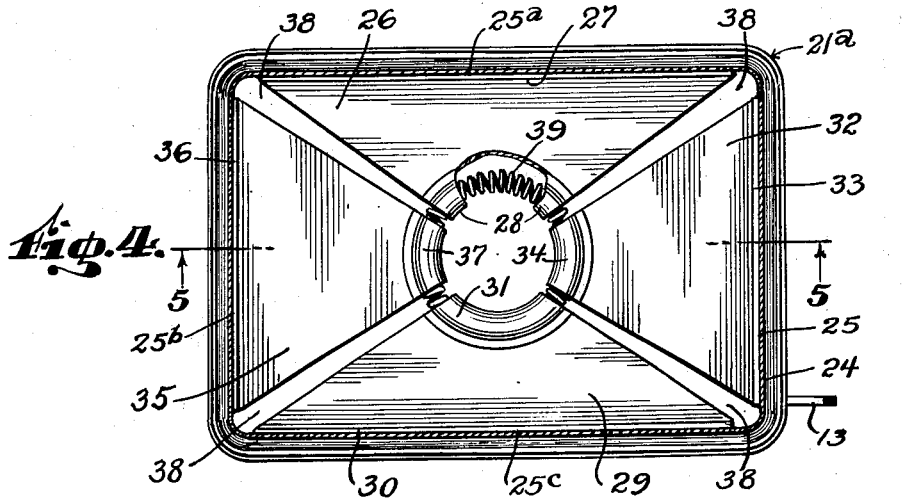
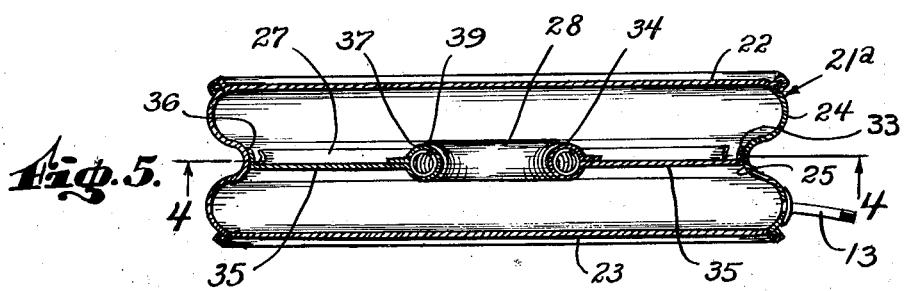
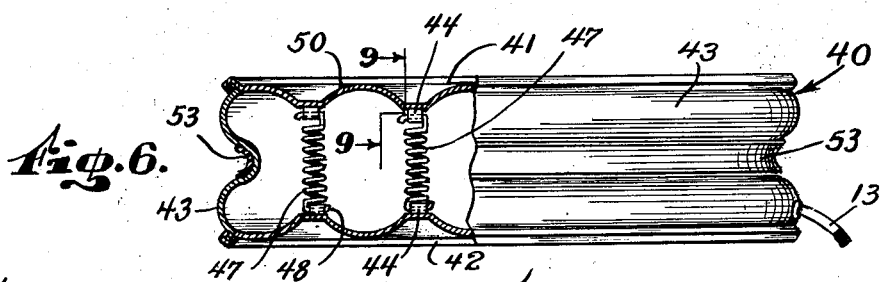
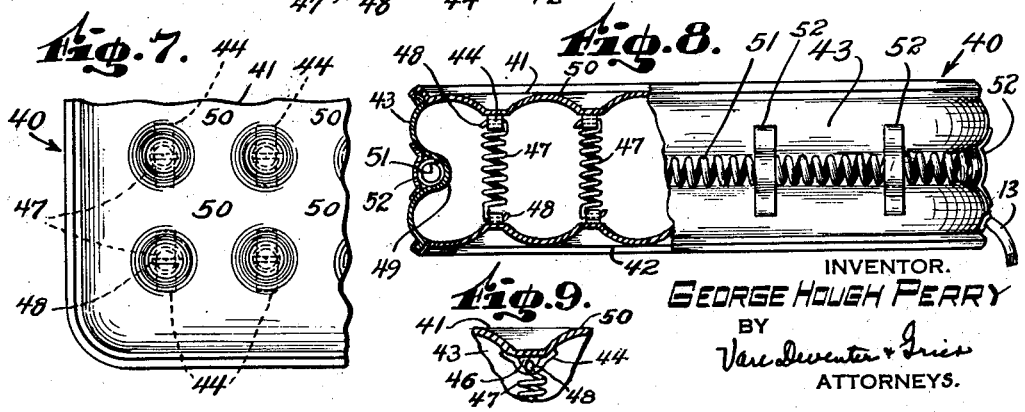
INVENTOR.
GEORGE HOUGH PERRY
BY
ATTORNEYS.

Patented Oct. 17, 1944

2,360,715

UNITED STATES PATENT OFFICE 2,360,715

PNEUMATIC CUSHION

George Hough Perry, Brooklyn, N. Y., assignor to Airtress Corporation of America, a corporation of New York Application May 14, 1942, Serial No. 442,882

7 Claims. (Cl. 5—348)

This invention relates to improvements in pneumatic cushions for seats and the like, and is directed more particularly to such cushions for use in the seats and backs of seats in motor vehicles.

An object of the invention is the provision, in a cushion formed of non-elastic material, of means whereby the virtually non-elastic covering is given power to expand or give under sudden increases of pressure in the air confined therein.

Another object of the invention is the provision, in a non-elastic cushion, of deformable portions elastically held against deformation so that when deformed, the elastic means returns the deformable portion to their normal positions.

Other objects will be apparent to those skilled in the art.

The type of cushion to which this invention particularly applies is that in which a main, weight-bearing, air-inflated body is made of semi-elastic or non-elastic material such as cloth. The material is made impermeable by impregnation or by covering the same with a suitable water-proofing and air-proofing material such as rubber-dispersion or flexible plastic, lacquer or varnish compounds.

It is obvious that this type of air cushion is entirely different from the usual type wherein the air-containing body is made of rubber or other elastic materials.

According to this invention, I provide means whereby the virtually non-elastic covering is given power to expand under sudden increases of pressure upon its confined air, such expansion being elastically controlled and adapted to return under the urge of the elastic control to its normal size and position when the increase of the interior pressure is over.

Non-expansible cushions of the prior art have depended for the cushioning effect entirely upon the elastic properties of the confined air therein. In small cushions, such as are used for seats and the like, the volume of such confined air is insufficient to absorb the heavier shocks without such a degree of compression as would make the cushion rigid, thereby the rider is subjected to an abrupt "snubbing."

In small cushions, such as are used for seats in aircraft, the volume of the confined air tends to increase as the aircraft goes up into the rarefied atmosphere due to the decrease in pressure of said atmosphere upon the exterior of the cushion, with the result that the air within the cushion causes said cushion to become rigid and lessens the comfort of the person sitting on said cushion.

Referring to the drawings:

Figure 4 is a plan view, partly in section, of a modified form of the cushion as seen along the line 4—4 of Figure 5;

Figure 5 is a sectional view, taken along the line 5—5 of Figure 4;

Figure 6 is a sectional view of a further modification wherein the tufts in the cushion are formed by elastic means within the body of the cushion;

Figure 7 is a plan view of one corner of the cushion shown in Figure 6;

Figure 8 is a sectional elevation of a further modification wherein the cushion is provided with spring means within the body for forming the tufts, and spring means outside of the body for controlling the deformation of the size of the cushion;

Figure 9 is a structural detail as seen along the line 9—9 of Figure 6; and

Figure 1:
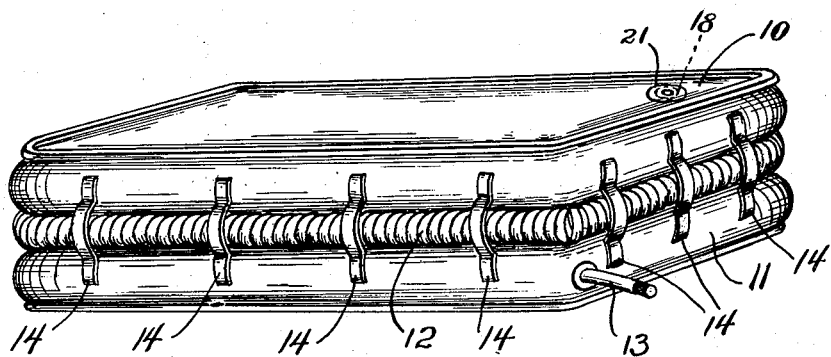
Fig. 1 is a perspective view of one form of non-elastic cushion, the sides of which are constructed so as to be deformable and have cooperating therewith elastic means tending to urge the deformed portions to their normal positions.

Figure 1 shows a perspective view of one form of air-inflated seat cushion embodying the present invention. It consists of an upper wall 10 and a like lower wall spaced apart from each other and joined by a continuous piece of material 11 which forms the sides of the cushion. The sides are tucked inwardly after the general manner of a bellows or accordion plait. Lying within the plait is a continuous helical spring 12 which completely embraces the sides of the cushion and lies within the V of the bellows or plait. The cushion is provided with the usual valve 13 through which it may be inflated.

A plurality of loops 14 are secured to the sides of the cushion and the continuous spring 12 extends through these loops. The loops are spaced apart from each other and resemble "belt straps."

The cushion is formed of leakage-proof fabric, or the like, which has been rubberized, lacquered or varnished in any of the well known commercial ways to make it impermeable by air.

The cushion may also have a system of interior stays (not shown) to control the separating movement of the top and bottom surfaces under inflation, and thereby form tufts therein.

When the bag is inflated and is subjected to any force which tends to increase its internal pressure, for example when subjected to the weight of a person sitting thereon, the increased pressure causes the accordion plaits or bellows-like sides of the cushion to deform outwardly against the urge of the spring 12 and thereby prevents unpleasant reactions such as abrupt "snubbing" or the like.

Although the belt surrounding the cushion is described as a continuous helical spring 12, it is obvious that this belt may be in the form of a strip of rubber, or any other elastic medium capable of subjecting the side walls of the cushion to a wanted urge.

Figure 2:
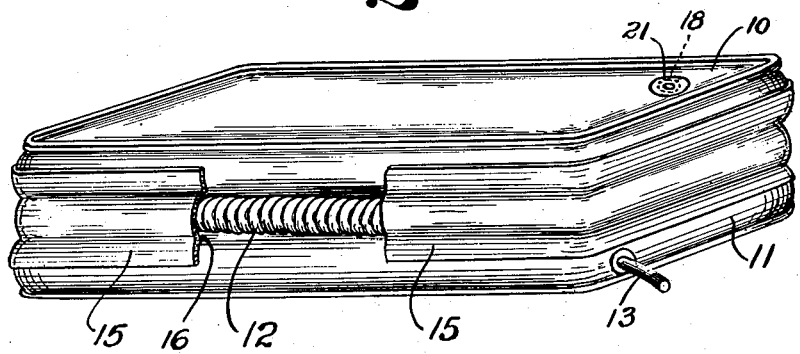
Figure 2 is a modification of the arrangement shown in Figure 1.
Figure 3:
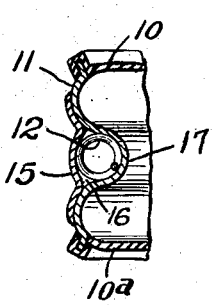
Figure 3 is a fragmentary sectional elevation of one edge of the cushion shown in Figure 2.

Figure 2 is a modification of Figure 1, wherein the top 10 and the strip forming the side walls 11 are similar. However, instead of using a plurality of spaced belt straps 14, an extra continuous strip of fabric is connected to the material forming the side walls 11 in the manner shown in Figure 3. It will be understood that the term "connected" used herein will be taken to mean, stitched, cemented, or otherwise secured. This continuous strip of material is designated by the numeral 15, and when the same is attached, provision is made whereby the continuous helical spring 12 may be fished through the space 16 between the inwardly looped portion 17 of the side walls 11 and the outer strip 15, whereby when said spring is positioned within the space 16, it is entirely concealed by the strip 15 which covers it up.

The fabric from which this cushion is formed has been described as rubberized, lacquered or varnished to make it impermeable by air. However, in fabricating the bag, if the parts are stitched together, leaks may be formed therein. In such cases, the completed cushion may be finally finished with an inside and an outside coating of thin rubber, lacquer or varnish.

Figure 10:
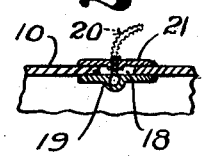
Figure 10 is a fragmentary view showing one method of sealing up a hole formed in the cushion through which the final finish may be sprayed after the cushion is fabricated.

In order to apply the inside coating, an opening 18 may be provided in the cushion so that the interior thereof may be sprayed therethrough, following which the hole 18 may be sealed up in a suitable manner, for example by applying an inner and outer disc such, for example, as is shown in Figure 10.

The inner disc 19 has swiveled thereto a threaded rod 20, a suitable depression having been formed in the disc 19 so that no air can leak therethrough.

A second disc 21 threadedly engages the rod 20, and by turning the rod 20, the disc 21 is forced (due to the threads) towards the disc 19 and thereby the fabric 10 therebetween is securely clamped between the discs 19 and 20.

After this is done, the threaded rod 20 may be broken off flush with the upper surface of the disc 21, and thereby a sealed closure of the hole 18 is effected. The outside final cutting may be applied in the usual way, for example by spraying either before or after the hole 18 is sealed up.

Referring now to the modifications shown in Figures 4 and 5, the cushion 21ª has an upper area 22 and a lower area 23 joined together by a continuous strip of material 24 which forms the sides of the cushion. The sides are tucked inwardly after the general manner of a bellows or accordion plait, the greatest depth of the plait or fold being designated by the numeral 25.

A fabric panel 26 has its upturned edge 27 stitched to the fold 25ª. The panel 26 is triangular in form and the edge opposite the edge 27 has an arcuate hem 28 formed therein.

A similar panel 29 has its upturned edge 30 stitched to the fold 25ᶜ (which is on the opposite side of the cushion). The panel 29 is likewise provided with an arcuate hem 31. A triangular panel 32 has an upturned edge 33 stitched to the fold 25 and its opposite edge has an arcuate hem 34 formed therein.

A second panel 35 is exactly like the panel 32 and has an upturned edge 36 stitched to the fold 25ᵇ and has an arcuate hem 37 formed in the opposite end thereof.

The panels 26, 29, 32 and 35 are so proportioned that ample clearance spaces 38 lie between adjacent edges thereof. A helical spring 39 is passed through the arcuate hems 28, 34, 31, and 37, and the ends of this spring are joined together to form an annulus.

When the cushion is inflated, an inward pull exerted by the annulus 39 is in turn exerted on the folds 25, 25ª, 25ᵇ, and 25ᶜ, so that upon an increase of the internal pressure of the cushion, the spring 39 will allow the sides 24 to deform outwardly, and as soon as the pressure is relieved the plaits and the sides return to their normal positions.

In the modifications shown in Figures 1 to 5, above described, it must be understood that the upper and lower surfaces of the cushion are provided with some means for holding them in definite relation to each other; otherwise, when pressure is applied, these surfaces would uncontrolledly bulge outwardly. Therefore, some means is provided between the upper and lower surfaces to form tufts therein, or to otherwise hold said surfaces in definite relation to each other.

In the modifications shown in Figures 6 and 7, I provide, merely by way of example, one method of controlling the upper and lower surfaces.

The cushion, generally designated by the numeral 40, has an upper surface or top 41, and a lower surface or bottom 42 spaced apart therefrom, a suitable continuous edge 43 being secured thereto to form a closed cushion. The top 41 and the bottom 42 has a series of tufts formed therein as follows: Secured to the interior of the upper surface is a series of strips 44. These strips are stitched to the surface 41 so that the mid-portions form loops 46. The lower surface 42 is provided with a series of identical strips 44, and these latter strips are preferably in vertical alignment with the strips on the upper surface. Springs 47 are provided at each end thereof with loops 48, and these loops engage the fabric loops 46, as may be seen in Figures 6 and 7. Therefore, when the cushion is inflated, the springs 47 hold the portions carrying the strips 44 inwardly and thereby form therebetween a series of tufts 50 in the upper and lower surfaces of the cushion.

In the modification shown in Figure 8, the cushion 40 has its upper surface 41 and its lower surface 42 formed in a series of tufts by means of the springs 47.

The continuous strip 43 forming the edges of the cushion are provided with an inward fold 49 there-around, and lying within the inner fold is a continuous helical spring 51, like the spring 12, and this spring is held in its normal position by means of belt straps 52 stitched to the side member 43 in spaced intervals, in a manner shown in Figure 1.

Thus it can be seen that when the cushion 40 of Figure 8 is inflated, the spring 51 holds the sides in, and the springs 47 form a series of tufts in the upper and lower surfaces 41 and 42, respectively.

The cushion shown in the modifications Figures 4 to 9, inclusive, may likewise be provided with an opening similar to the opening 18, through which the final finish coat may be sprayed to seal up all the holes formed therein by the stitching, said holes adapted to be sealed up afterwards as hereinbefore described.

Although I have described by way of example a preferred form of cushion and several modifications thereof, said cushions being made of non-elastic material, it is obvious that many changes may be made in the arrangements shown and described, and the cushions may be small for use in seats or the like, or they may be larger and made in the form of mattresses, without departing from the spirit of the invention as set forth in the following claims.

What is claimed is:

1. In a generally rectangular pneumatic cushion for seats and the like, a top member, a bottom member, side members joining said top and bottom members and forming an air-tight bag, resilient means embracing and cooperating with all said side members for normally deforming said side members inwardly, and an inflating tube communicating with the interior of said bag.

2. In a pneumatic cushion for seats and the like, a top member formed of non-elastic material, a bottom member formed of non-elastic material, a continuous strip joining said top and bottom members to form an air-tight bag and forming the sides thereof, said sides being adapted to be deformed inwardly, resilient means embracing and acting substantially continuously upon all said sides for urging said sides into inwardly deformed positions, means connected to said strip forming the sides of said cushion and forming therewith channel portions receiving said resilient members to retain the same on said sides, and an inflating valve through which said cushion may be inflated.

3. A pneumatic cushion for seats and the like formed of non-elastic material and including a top member, a bottom member, side members joining said top and bottom members and forming an air-tight bag, said side members having an inwardly extending plait formed therein, resilient means lying within said plait for normally urging the same inwardly, a series of spaced belt straps secured to said side members and spanning said plait for retaining said resilient means therein, and an inflating tube communicating with the interior of said bag, said plait being adapted to be deformed outwardly when said cushion is subjected to influences increasing the internal pressure thereof.

4. A pneumatic cushion for seats and the like formed of non-elastic material and including a top member, a bottom member, side members joining said top and bottom members and forming an air-tight bag, said side members having an inwardly extending plait formed therein, a continuous helical spring means positioned within said plait and spanning all of said sides, for normally urging the same inwardly, a series of spaced belt straps secured to said side members and spanning said plait for retaining said spring means therein, and an inflating tube communicating with the interior of said bag, said plait being adapted to be deformed outwardly when said cushion is subjected to influences increasing the internal pressure thereof.

5. A pneumatic cushion for seats and the like formed of non-elastic material and including a top member, a bottom member, side members joining said top and bottom members and forming an air-tight bag, said side members having an inwardly extending plait formed therein, a strip of material secured to said sides and overlying said plait thereby forming a continuous channel, continuous resilient means positioned within said channel for normally urging the same inwardly, and an inflating tube communicating with the interior of said bag, said plait being adapted to be deformed outwardly when said cushion is subjected to influences increasing the internal pressure thereof.

6. A pneumatic cushion for seats and the like formed of non-elastic material and including a top member, a bottom member, side members joining said top and bottom members and forming an air-tight bag, said side members having an inwardly extending plait formed therein, a strip of material secured to said sides and overlying said plait thereby forming a continuous channel, a continuous helical spring positioned within said channel and having its ends joined for normally urging the same inwardly, and an inflating tube communicating with the interior of said bag, said plait being adapted to be deformed outwardly when said cushion is subjected to influences increasing the internal pressure thereof.

7. A pneumatic cushion for seats and the like formed of non-elastic material and including a top member, a bottom member, side members joining said top and bottom members and forming an air-tight bag, said side members having a continuous inwardly-extending plait formed therein, resilient means lying within said plait completely embracing the same and normally urging all said side members inwardly, and an inflating tube communicating with the interior of said bag, said plait and said resilient means being adapted to be deformed outwardly when said cushion is subjected to influences increasing the internal pressure thereof.

GEORGE HOUGH PERRY.